Figure 1:
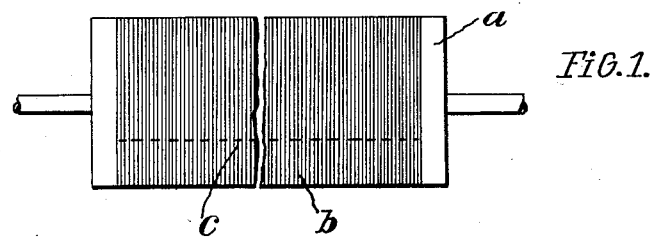

Sept. 27, 1938.   H. F. C. CORDTS   2,131,024

MANUFACTURE OF FABRIC FROM SPUN GLASS

Filed Oct. 16, 1935

H. F. C. Cordts
Inventor
By: Glascock Downing & Seebold
Attys.

Patented Sept. 27, 1938

2,131,024

UNITED STATES PATENT OFFICE 2,131,024

MANUFACTURE OF FABRIC FROM SPUN GLASS

Hans Friedrich Carl Cordts, Volksdorf, near Hamburg, Germany, assignor to Thuringische Glaswollindustrie vorm. S. Koch Gesellschaft mit beschränkter Haftung, Hamburg, Germany Application October 16, 1935, Serial No. 45,367
In Germany November 16, 1934

6 Claims. (Cl. 154—2)

It is known to secure a layer of glass filaments by means of an adhesive to a support, for example of leather, paper, felt, fabric, gauze or the like, and to arrange over the glass filaments a protecting layer, for example, Celluloid, mica or the like. In this way an imitation of textile fabrics is produced. The known imitation however, is comparatively expensive in manufacture, since in addition to the glass filaments, a separate support is required which has to be made in other machines and for which separate materials are necessary. In many cases these imitations cannot be used in combination with other fabrics since it is desired to make a product of inorganic substances only in order to avoid decomposition.

In the method according to the invention a support of leather, paper or the like combined with the glass fabric is avoided and a glass fabric is made consisting solely of spun glass filaments and adhesive material. The method according to the invention consists in this, that firstly spun glass filaments are arranged parallel and closely side by side, then an adhesive is applied on this layer of glass filaments which connects them to form a coherent glass web, and a further layer of parallel glass filaments is placed on the firstmentioned layer, the filaments of the second layer intersecting those of the first layer. Finally an adhesive is applied over the second layer of glass filaments which firmly connects these filaments together and to the filaments of the lower layer.

In a particularly advantageous method of carrying out the process a drum is used on which one or more glass filaments are wound closely and approximately side by side. On the layer of glass filaments thus formed an adhesive is applied so that a coherent annular glass web is obtained. This is cut along a generating line of the drum and is placed on the drum again in another position, so that the glass filaments of the web lie approximately parallel to the generating lines of the drum. On this layer of glass filaments a second layer of filaments is wound so that now two layers of intersecting glass filaments lie one above the other. The filaments of the second layer are connected together and to the filaments of the first layer by the application of an adhesive.

A glass web made according to the new method has the appearance of a fabric which possesses great resistance to tearing and can be used, amongst others, for purposes for which jute fabric, cotton fabric, papers and the like are employed. It may be very thin, that is, in section it may have a thickness of a fraction of a millimetre, and therefore it can be brought into any desired form like a fabric. The manufacture of the glass web is comparatively simple since only spun glass filaments and an adhesive are used.

The method according to the invention will be illustrated by way of example with reference to the accompanying diagrammatic drawing.

Figure 2:
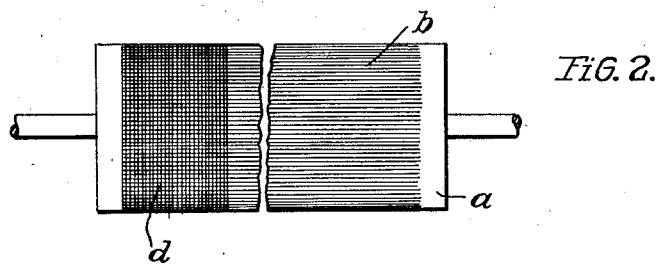
Figure 3:
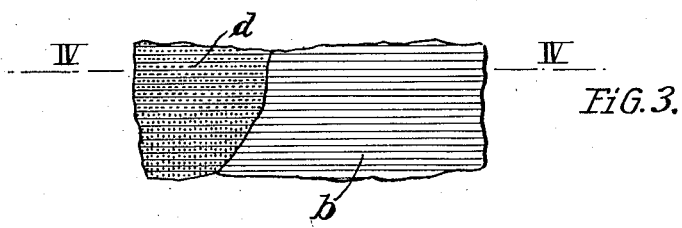
Figure 4:
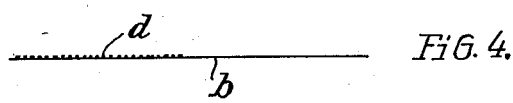

Fig. 1 is a diagram of the device for carrying out the method according to the invention, Fig. 2 shows a similar device but with the method according to the invention carried further, Fig. 3 shows a glass web made by the method according to the invention, Fig. 4 shows a section through Fig. 3 on the line IV—IV.

For carrying out the method according to the invention on the periphery of a drum $a$, for example by winding, one or more spun glass threads $b$ are arranged closely side by side to form a layer. These filaments are connected together by an adhesive, for example, containing rubber, and then the layer on the drum $a$ consisting of glass filaments and adhesive is cut, for example along the line $c$, and removed from the drum $a$. Then the glass web removed from the drum is again placed on the drum in such a manner that the filaments extend in the longitudinal direction of the drum, that is parallel to its generating lines.

Then a second layer of filaments $d$ is wound on to the drum. These filaments $d$ run at an angle, preferably a right angle, to the filaments of the first layer. The filaments $d$ of the second layer, like the filaments $b$ of the first layer, are stuck together and also to the filaments $b$ of the first layer by the application of an adhesive on the filament layer b. Then the glass web formed in this way is removed from the drum $a$, for example by cutting. It can then be worked up for various purposes.

Instead of two layers with intersecting filaments $b$ and $d$ a number of such layers could be placed one above the other and connected together, whereby the individual filaments could extend in various directions, but preferably with the filaments of one layer intersecting those of the neighbouring layers. The glass web naturally becomes stronger when several layers are used.

In Figs. 3 and 4 the arrangement and position of the filaments is illustrated on a larger scale. Especially from Fig. 4 it will be seen that the filaments are not interwoven but are simply superposed one over another.

What I claim is:—

1. Method of making fabrics from spun glass consisting in winding a spun glass filament on a drum in such a manner that the convolutions lie close together and are parallel, applying an adhesive on this layer of glass filaments to connect them to form a coherent cylindrical glass web, cutting this web along a generating line of the drum, replacing the web on the drum so that the filaments extend substantially in the direction of the generating lines of the drum, winding a further layer of filaments on the drum, applying adhesive on said layer and cutting the glass fabric so formed along a generating line of the drum.

2. Method of making fabrics from spun glass consisting in winding a plurality of spun glass filaments on a drum in such a manner that the convolutions lie close together and are parallel, applying an adhesive on this layer of glass filaments to connect them to form a coherent cylindrical glass web, cutting this web along a generating line of the drum, replacing the web on the drum so that the filaments extend substantially in the direction of the generating lines of the drum, winding a further layer of filaments on the drum, applying an adhesive on said layer and cutting the glass fabric so formed along a generating line of the drum.

3. A method of making fabric from spun glass, consisting in winding a continuous spun glass filament onto a drum in such a manner that the convolutions lie close together and are in exactly relative parallel position and form a layer of single filament thickness, connecting the filament convolutions together by an adhesive and cutting the formed glass web along a generating line of the drum.

4. A method of making fabric from spun glass, consisting in winding a plurality of continuous spun glass filaments onto a drum in such a manner that the convolutions lie close together and are in exactly relative parallel position and form a layer of single filament thickness, connecting the filament convolutions together by an adhesive and cutting the formed glass web along a generating line of the drum.

5. A product consisting of two superposed layers of glass filaments, all of the filaments of each layer being laid side by side in parallel relation in single thickness, the filaments of one layer intersecting the filaments of the other layer and an adhesive holding together the adjacent parallel filaments of each layer and the two layers.

6. A product consisting of a plurality of superposed layers of glass filaments, all of the filaments of each layer being laid side by side in parallel relation in single thickness, the filaments of one layer intersecting the filaments of the adjoining layers and an adhesive holding together the adjacent parallel filaments of each layer and the several layers.

HANS FRIEDRICH CARL CORDTS.